United States Patent [19]

Mabilon et al.

[11] Patent Number: 5,051,392

[45] Date of Patent: Sep. 24, 1991

[54] MULTIFUNCTIONAL CATALYST FOR TREATING EXHAUST FUMES FROM INTERNAL COMBUSTION ENGINES, CONTAINING URANIUM, AT LEAST ONE URANIUM PROMOTOR AND AT LEAST ONE PRECIOUS METAL, AND ITS PREPARATION

[75] Inventors: Gil Mabilon, Saint Germain en Laye; Daniel Durand, Rueil Malmaison; Philippe Courty, Houilles; Michel Prigent, Rueil Malmaison, all of France

[73] Assignee: Institut Francais du Petrole, Rueil Malmaison, France

[21] Appl. No.: 527,769

[22] Filed: May 24, 1990

[30] Foreign Application Priority Data

May 24, 1989 [FR] France ................... 89 06896

[51] Int. Cl.$^5$ .................. B01J 23/10; B01J 23/12; B01J 23/58
[52] U.S. Cl. .................. 502/303; 502/65; 502/66; 502/243; 502/250; 502/263; 502/302; 502/328; 502/330; 502/332; 502/333; 502/334
[58] Field of Search ............ 502/303, 328, 330, 65, 502/66, 243, 250, 263, 302, 332, 333, 334; 423/213.5

[56] References Cited

U.S. PATENT DOCUMENTS

| 3,907,708 | 9/1975 | Lacroix | 502/335 X |
| 4,085,193 | 4/1978 | Nakajima et al. | 502/328 X |
| 4,323,542 | 4/1982 | Joy | 502/333 X |

FOREIGN PATENT DOCUMENTS 58-124544  7/1983  Japan .................. 502/304

Primary Examiner—W. J. Shine
Attorney, Agent, or Firm—Antonelli, Terry, Stout & Kraus

[57] ABSTRACT

A multifunctional catalyst, a method of preparing the catalyst and the use of the catalyst in treating exhaust fumes from internal combustion engines are described. The catalyst includes a porous layer containing (weight %, dry):

about 50 to about 99.7% of at least one refractory inorganic oxide, about 0.1 to about 25% of at least one uranium oxide, about 0.1 to about 35% of at least one oxide of at least one metal P selected from the group consisting of lithium, sodium, potassium, rubidium, cesium, beryllium, magnesium, calcium, strontium, barium, lanthanum, praseodymium, neodymium, gadolinium, and yttrium and about 0.1 to 20% of a metal A selected from the group consisting of platinum, rhodium, palladium, ruthenium, iridium, and mixtures thereof.

16 Claims, No Drawings

MULTIFUNCTIONAL CATALYST FOR TREATING EXHAUST FUMES FROM INTERNAL COMBUSTION ENGINES, CONTAINING URANIUM, AT LEAST ONE URANIUM PROMOTOR AND AT LEAST ONE PRECIOUS METAL, AND ITS PREPARATION

BACKGROUND OF THE INVENTION

The invention concerns a multifunctional catalyst, its method of preparation and its use in treating exhaust fumes from internal combustion engines, more specifically for converting the carbon monoxide, hydrocarbons and nitrogen oxides contained in these fumes.

Exhaust fumes from internal combustion engines essentially contain nitrogen, water, carbon dioxide, oxygen and hydrogen, which are considered as relatively harmless, and carbon monoxide, hydrocarbons and nitrogen oxides, which are known to pollute the environment. The preferred method of eliminating these pollutants is catalytic promotion of the oxidation-reduction reactions between them or with relatively harmless compounds, essentially to form nitrogen, water and carbon dioxide, all of which are relatively harmless to the environment.

A catalyst is described as multifunctional, when it is capable of simultaneously promoting the conversion of a plurality of pollutants to relatively harmless compounds.

Catalysts for treating exhaust fumes may be in the form of spheres or monolithic blocks. In this case the catalyst comprises an inert metal or ceramic substrate, which is coated with a layer generally of alumina, cerium oxide and precious metal oxides.

The richness of an air-fuel mix supplying an engine is defined as the ratio between the stoichiometric air/fuel ratio and the actual air/fuel ratio. A richness level of 1 signifies that the air-fuel mix is strictly stoichiometric. A richness of over 1 signifies that the mix contains an excess of fuel relative to the quantity of air present.

The state of the art is illustrated by U.S. Pat. No. 4,526,886, British Patent 1,262,076, U.S. Pat. No. 4,162,262 and French Patent 2,165,056.

More specifically, cerium oxide is known to stabilise alumina and to have an oxygen storing capacity (J. S. SHYU, W. H. WEBER and H. S. GANDHI, J. Phys. Chem. 1988, 92, 4964). It increases the activity of catalysts for a reaction wherein a gas is converted to water.

The oxygen storage capacity is the ability—which cerium and some other materials have—to be oxidised in an oxidising exhaust gas and, in being reduced, to oxidise reducing compounds even when the exhaust gas becomes a reducing agent.

Catalysts not containing any cerium but containing uranium have already been described for treating exhaust fumes from internal combustion engines. Thus British patent GB 1 262 076 describes a catalyst containing iron, nickel and uranium deposited on alumina. But this catalyst does not contain any precious metals, a fact which greatly limits its effectiveness in converting the pollutants.

U.S. Pat. No. 4,526,886 describes a catalyst containing uranium, platinum and rhodium dispersed on an inorganic oxide carrier with a large specific surface area. The catalyst is more particularly effective when it operates in an exhaust gas with a mean richness of over 1, or with a mean richness of 1 but with strong oscillations around that value. Furthermore it remains very active even in the presence of oxide of sulphur.

However, known catalysts containing uranium have the disadvantage that their activity is much degraded when they are subjected to prolonged high temperature treatment.

SUMMARY OF THE INVENTION

It has surprisingly been found possible to heat stabilise the catalytic activity of catalysts adapted to treat exhaust fumes from internal combustion engines running on petrol or gas oil. It has also been found possible—just as unexpectedly—to reduce the discharge of polyaromatic hydrocarbons into the atmosphere. And finally, the invention has been found to improve the initial activity of the catalyst and also its stability during high temperature treatment, e.g. at a temperature of over 800° C.

The invention thus concerns a multifunctional catalyst for converting the carbon monoxide, hydrocarbons and nitrogen oxides contained in the exhaust fumes from internal combustion engines, comprising a carrier containing a porous layer which contains a catalytically active phase comprising at least one metal A selected from the group consisting of platinum, rhodium, palladium, ruthenium, iridium and mixtures thereof, characterised in that the porous layer comprises (weight %, dry):

about 50 to about 99.7% of at least one refractory inorganic oxide, about 0.1 to about 25% of at least one uranium oxide, about 0.1 to about 35% of at least one oxide of at least one metal P, selected from the group consisting of lithium, sodium, potassium, rubidium, cesium, beryllium, magnesium, calcium, strontium, barium, lanthanum, praseodymium, neodymium, gadolinium, yttrium and zirconium, and, about 0.1 to about 20% of said metal A.

The multifunctional catalyst of the invention, which provides the best compromise in the oxidation of carbon monoxide and hydrocarbons and the reduction of nitrogen oxides, advantageously comprises a porous layer containing (weight %, dry):

about 82 to about 96.6% of at least one refractory inorganic oxide, about 2 to about 12% of at least one uranium oxide, about 1 to about 15% of at least one oxide of said metal P, and about 0.4 to about 8% of at least one metal A.

Platinum and preferably the platinum-rhodium couple is advantageously used as the metal A. Very good stability at high temperature has been obtained by operating with the above metal couple and oxides of promoting metal P, such as lanthanum, barium or potassium.

The improvement in the heat stability of catalysts according to the invention enables their service life to be extended under real life conditions. Thus it is possible to comply with the standards for the discharge of pollutants from motor vehicles even when these have travelled 80,000 km.

The invention comprises another catalyst carrier particularly for treating exhaust fumes from internal combusion engines, comprising alumina spheres or extrusions containing uranium and at least one other element in the group comprising lithium, sodium, potassium, rubidium, cesium, beryllium, magnesium, calcium, strontium, barium, yttrium, zirconium, lanthanum, praseodymium, neodymium, samarium, europium and gadolinium.

The invention proposes a catalyst prepared on one or other of these carriers, by depositing at least one metal from the group comprising platinum, palladium, rhodium, iridium and ruthenium.

The substrates according to the invention are generally metallic or ceramic.

The metal substrates are particularly those obtained from alloys of iron, nickel and chromium or those obtained from alloys of iron, chromium and aluminium. Alloys which also contain iron, chromium and aluminium, cobalt and/or cerium and/or yttrium may equally be used. The metal may also be carbon steel or ordinary cast iron.

Metal substrates containing aluminium may advantageously be pretreated by heating them in an oxidising atmosphere, under time and temperature conditions which will enable a surface layer of aluminium oxide to form from the aluminium contained in the alloy. In the case of carbon steels or cast iron, these may also be pretreated by annealing the iron or steel, when it has first been covered with an aluminium layer in order to cover the substrate with an aluminium/iron diffusion layer.

The ceramic substrates may e.g. be those in which the main material is at least one compound from the group formed by cordierite, alumina, mullite, porcelain, boron or silicon carbides or nitrides, aluminium titanate, zirconium and zeolites.

DETAILED DESCRIPTION OF THE INVENTION

In a preferred embodiment of the invention, the rigid substrate structure is advantageously a cellular honeycomb structure which may take a square, hexagonal, tetragonal, triangular or undulating form. It must allow gas to pass into the channels or conduits formed in the production process by extrusion, solidification of components in sheet form, or juxtaposition of a flat sheet with an undulating sheet etc.

The substrate structure may equally be of the ceramic sponge type, such as that known under the trademark of Selee, or it may be a matrix of metal or ceramic fibres.

The catalyst carrier is obtained by depositing a porous layer on the substrate. The depositing process generally follows the unit shaping operation, although it may equally precede it, particularly in the case of metal substrates.

The refractory inorganic oxide is generally selected from the group formed by alpha alumina, gamma alumina, delta alumina, kappa alumina, eta alumina, theta alumina, rho alumina, chi alumina, silica, alumina-silica, zeolites and mixtures thereof in any proportions. It is preferably to use gamma alumina as it has a larger specific surface area.

The alumina is of the type normally used in catalysis. It may be produced by calcining a decomposable salt or a hydrate. In the latter case the hydrate may itself emanate from hydrolysis of an alcoholate, like the products sold by Condea under the name of Disperal, or by Vista under the name of Catapal; or alternatively emanate from a reaction between a base and a solution of an aluminium salt, such as aluminium nitrate, sulphate, carbonate or chloride. Pseudo-boehmites in the Versal range produced by Kaiser may be used. The alumina may alternatively be a commercial one such as those sold by Rhone-Poulence under the name of Spheralite, by Condea under the name of Puralox or by Kaiser under the name of Versal GL or GH. Finally, it may be obtained by mixing at least two of the above-mentioned aluminas.

The alumina included in the porous layer is preferably one with a specific surface area of over 10 $m^2/g$, e.g. from 20 to 250 $m^2/g$, and with a pore volume of over 0.05 $cm^3/g$, e.g. from 0.1 to 2 $cm^3/g$.

The invention concerns methods of preparing the catalyst. In a first method the follow successive stages may be carried out:

a) Preparing an aqueous suspension of at least one refractory inorganic oxide, at least one uranium salt or oxide and at least one salt or oxide of metal P or at least one composite oxide of uranium and metal P, b) coating the substrate with the suspension, so as to obtain the porous layer containing said inorganic oxide, said uranium salt or oxide and said salt or oxide of metal P, or said composite oxide of uranium and metal P, c) drying and heat treating at a temperature below 1000° C., d) impregnating the porous layer resulting from stage c) with a solution of at least one precursor of at least one metal A, and e) drying and carrying out heat treatment at a temperature below 1000° C.

In a second preparation method the following stages are generally carried out:

a) preparing an aqueous solution of at least one refractory inorganic oxide, b) coating the substrate with the suspension, so as to obtain the porous layer containing the refractory inorganic oxide, c) drying and carrying out heat treatment at a temperature below 1000° C., d) impregnating the porous layer resulting from stage c) either with a solution of at least one uranium salt and at least one salt of metal P, or with a solution of at least one uranium salt, at least one salt of metal P and at least part of at least one precursor of at least one metal A, e) drying and carrying out heat treatment at a temperature below 1000° C., f) impregnating the porous layer resulting from stage e) either with all of at least one precursor of at least one metal A, or with the remainder of at least one precursor of at least one metal A, and g) drying and carrying out heat treatment at a temperature below 1000° C.

In a third preparation method, for when the porous layer is made up of spheres or extrusions, the following stages are generally carried out:

a) Impregnating the spheres or extrusions of at least one refractory inorganic oxide with a solution of at least one uranium salt and at least one salt of metal P, b) drying and carrying out heat treatment at a temperature below 1000° C., c) impregnating the spheres or extrusions resulting from stage b) with a solution of at least one precursor of at least one metal A, and d) drying and carrying out heat treatment at a temperature below 1000° C.

In a fourth preparation method, the following stages must be carried out after the preceding stages a) and b), c) grinding the spheres or extrusions to obtain a powder, d) preparing an aqueous suspension containing said powder and possibly adding at least one refractory inorganic oxide, e) coating the substrate with the suspension, so as to obtain the porous layer containing the refractory inorganic oxide or oxides, and said oxides of uranium and of at least one metal P, f) impregnating the porous layer resulting from stage e) with a solution of at least one precursor of at least one metal, e) drying and carrying out heat treatment at a temperature below 1000° C.

Finally, when the substrate is made up of metal sheets, one can either coat and impregnate the sheets by the first, second and fourth methods, carry out the heat treatment and shape the monolithic block, or one can coat the sheets by the first and fourth methods, carry out the heat treatment and shape the monolithic block. When the substrate has been shaped, the porous layer resulting from heat treatment is impregnated with a solution of at least one precursor of at least one metal A, and heat treatment is carried out at a temperature below 1000° C.

The porous layer of alumina may be obtained by steeping the substrate in a solution of an aluminium salt or of an organo aluminium compound, possibly followed by hydrolysis and calcination at at least 400° C.

In a preferred embodiment the alumina may be deposited on the substrate by coating the substrate with an alumina suspension.

The suspension generally contains a dispersible alumina like Pural or Dispersal marketed by Condea, Catapal marketed by Vista, or Versal marketed by Kaiser. The suspension may also be prepared from a relatively non-dispersible alumina powder like Spheralite produced by Rhone-Poulenc, Versal GI or Versal GH produced by Kaiser or Puralox produced by Condea. A suspension containing a mixture of both types of alumina, with a high and a low capacity for dispersion, is one of the preferred embodiments, as described in French patent no. 2 512 004.

The suspension is generally formed by adding the alumina powder or powders to an aqueous solution with a pH from 3 to 9.

Coating may be carried out by steeping the metal or ceramic substrate in the suspension, draining the coated piece, then blowing air onto it, so that orifices still obstructed by the suspension are completely cleared.

In cases where a metal substrate is used, the flat and undulating metal sheets may advantageously be steeped in said suspension, drained then dried before being shaped, in accordance with the method described in patent FI 863705; or said suspension may be sprayed onto the two surfaces of the metal sheets, then they can be dried as mentioned above.

The coated piece is generally dried and heat activated at a temperature of at least 400° C., for at least half an hour, to improve the adhesion of the alumina layer.

There are several ways of adding the uranium:

in a first embodiment, by so-called dry impregnation of alumina spheres or powder with a solution of at least one uranium salt, such as uranyl nitrate or chloride, followed by heat activation at a temperature of at least 400° C.; this gives a relatively non-dispersible alumina already containing uranium, which can subsequently be used in suspension after grinding.

in another embodiment the uranium is added to the alumina suspension in the form of a soluble salt such as uranyl nitrate or chloride, or in the form of uranium oxide powder obtained e.g. by calcining the precipitate resulting from the action of ammonia on a solution of a uranyl salt, e.g. uranyl nitrate, at least at 400° C. for half an hour.

in another embodiment the uranium is deposited on the piece previously coated with alumina by steeping the piece in an aqueous solution of uranyl nitrate or chloride, then calcining it at a temperature of at least 400° C.

another embodiment comprises adding the uranium by at least two of the above procedures, e.g. by impregnating part onto the alumina powder prior to coating, then more of it, e.g. after coating.

It is known in the art that uranium forms many oxides, particularly $UO_2$, $UO_3$ and $U_3O_8$, as well as non-stoichiometric oxides. To simplify the description and examples, weight fractions have been calculated on the basis of the oxide $U_3O_8$.

The selected promoter or promoters may be deposited simultaneously with the uranium, by at least one of the procedures described above; or they may deposited after the uranium by at least one of the procedures described above; or they may added in the form of at least one composite oxide or a solid solution of the formula $U_xP_yO_z$ where P represents a promoter.

The precursors of the chosen promoters may be salts which are soluble in an aqueous or non-aqueous medium, such as nitrates and chlorides, acetyl acetonates, formates, acetates, hydroxides and/or relatively insoluble compounds such as hydroxides, carbonates, hydroxycarbonates etc. These last compounds will generally be added to the suspension before it is deposited.

After the coating operation and the addition of uranium and at least one of the promoters in the above group, the coated block is dried and thermally activated.

The drying temperature is generally from 50° to 150° C. The drying time, at least half an hour, may be extended to achieve a mean residual water content of a maximum of 8% and preferably a maximum of 5%.

For some catalytic compositions it may be advantageous to dry with moist air or to carry out hydrothermic drying under pressure.

The thermal activation which follows the drying operation is generally carried out up to a temperature of at least 400° C. for at least half an hour. It may be found advantageous to raise the temperature gradually, e.g. by 50° C. per hour, and operate with air scavenging.

With the deposition of selected metals from the group comprising platinum, palladium, rhodium, iridium and ruthenium on the carrier, the catalyst is obtained.

The metals are normally deposited by impregnating the carrier with a solution of their precursors. The precursors used are those conventionally used to prepare catalysts, particularly and when they exist, chlorides, acid homoloques of chlorides, chlorine complexes, nitrates, ammino complexes and acetyl acetonates. Some non-restrictive examples are hexachloroplatinic acid, platinum tetrammine chloride, platinum dinitrodiammine, palladium nitrate, palladium chloride, palladium tetrammine dichloride, rhodium trichloride, rhodium nitrate, hexachloroiridic acid, ruthenium trichloride and ruthenium pentammine dichloride.

Impregnation is generally carried out by wetting the carrier with a volume of solution of precious metal precursors at least equal to half the pore volume of the porous layer.

In another embodiment of the invention, at least part of at least one of the above-mentioned precious metals may be introduced at a previous stage:

either by impregnating alumina spheres or relatively non-dispersible alumina powder, prior to coating, or by impregnating an insoluble uranium compound, e.g. the oxide U308, prior to coating, or by impregnating an insoluble compound of at least one of the above-mentioned promoters, e.g. a rare earth hydroxide or an alkaline earth metal hydroxycarbonate, prior to coating, or by impregnating the porous coating layer which has previously been thermally activated, before depositing the uranium compound and/or before depositing at least one promoting compound from the above list.

In cases where the carrier is made up of spheres or extrusions, impregnation may be carried out by wetting it with a volume of precious metal solution at least equal to half the pore volume of the spheres or extrusions.

The impregnated carrier is generally heat activated at a final temperature of at least 300° C., to give a catalyst for treating exhaust fumes from internal combustion engines.

An advantageous feature of the invention is that the sum of the concentrations of uranium and metals P expressed in elemental form, is at least one-third of the concentration of metals A, and may preferably be at least half the concentration of metals A.

In cases where the catalyst carrier is in the form of spheres or extrusions, the composition of the carrier is the same as that given above for the porous layer of catalysts comprising a substrate.

In cases where the catalyst carrier comprises a ceramic or metallic substrate, the quantity of porous layer is generally from 20 to 200 g/l of substrate and preferably from 50 to 150 g/l.

The examples which follow illustrate the invention but do not limit its scope.

EXAMPLE 1: PREPARATION OF A PRIOR ART CATALYST (A)

30 g of pure nitric acid is diluted with 3 l of softened water. 850 g of EXP Spheralite SPH 531 alumina (which will hereinafter be referred to as EXP 531) is added to the solution. The EXP 531 is in powder form, produced by Rhone-Poulenc and precalcined at 500° C. 400 g of Disperal alumina in powder form is also added. This is produced by Condea and its loss of weight on combustion at 500° C. is 25%. After calcination at 500° C. the specific surface area of alumina EXP 531 is 115 m²/g, while that of Disperal alumina is 184 m²/g. Their respective pore volumes are 1.15 and 0.60 cm³/g.

The suspension is used to coat a 0.904 l block of cordierite produced by Corning, 380 g in weight and with 62 cells/cm.

The coated block is drained and blown out by passing it in front of a jet of compressed air to clear the channels. It is then dried and calcined at 500° C. for 3 hours.

The weight of alumina deposited on the block is 90 g.

The block is then impregnated with 150 ml of a solution of uranyl nitrate in softened water, containing a weight of uranium equivalent to 6 g of oxide U308. It is then activated by calcination at 500° C. for 3 hours.

The block coated with alumina and uranium is then impregnated with 150 ml of a solution of hexachloroplatinic acid and rhodium trichloride containing 1.064 g of platinum and 0.213 g of rhodium. After one hour of contact the block is dried at 150° C. for one hour and calcined at 500° C. for 3 hours.

The composition of the porous layer of catalyst (A) thus prepared is:

| | |
|---|---|
| alumina | 92.52% |
| uranium oxide | 6.17% |
| platinum | 1.09% |
| rhodium | 0.22% |

EXAMPLE 3: PREPARATION OF A COMPARATIVE CATALYST (C)

A catalyst is prepared by the procedure described in Example 1, but the quantity of uranyl nitrate used contains the equivalent of 8.8 g of uranium oxide.

After impregnation with platinum and rhodium and thermal activation the composition of the porous layer of catalyst (B) is:

| | |
|---|---|
| alumina | 89.93% |
| uranium oxide | 8.79% |
| platinum | 1.06% |
| rhodium | 0.21% |

EXAMPLE 3: PREPARATION OF A COMPARATIVE CATALYST (C)

A 0.904 liter block of ceramic substrate is coated with 90 g of alumina by the method described in Example 1.

The block is then impregnated with 150 ml of an aqueous solution of barium nitrate containing the equivalent of 2.5 g of barium oxide BaO. It is then activated by calcination at 500° C. for 3 hours.

The carrier is then impregnated with 1.064 g of platinum and 0.213 g of rhodium by the method described in Example 1.

The composition of the porous layer of catalyst (C) thus prepared is:

| | |
|---|---|
| alumina | 95.97% |
| barium oxide | 2.67% |
| platinum | 1.13% |
| rhodium | 0.23% |

EXAMPLE 4: PREPARATION OF A CATALYST (D) ACCORDING TO THE INVENTION

Uranium and barium are deposited on the relatively non-dispersible alumina by impregnating 900 g of alumina EXP 531 with 1050 ml of a solution of uranyl nitrate and barium nitrate in softened water. The solution contains the equivalent of 83 g of U308 and 35 g of BaO. The impregnated alumina is then dried for one hour at 150° C. then calcined for 3 hours at 500° C. and ground.

A 0.904 l ceramic block is coated by the method described in Example 1, with a suspension containing 990 g of powdered alumina impregnated with uranium and barium and 440 g of powdered Disperal.

After the coating operation and calcination at 500° C. for 3 hours, the weight of the coated and calcined block is 98 g greater than the initial weight of cordierite.

The carrier is then impregnated with 1.064 g of platinum and 0.213 g of rhodium by the method described in Example 1.

The composition of the porous layer of catalyst (D) thus prepared is:

| | |
|---|---|
| alumina | 90.14% |

|            |       |
|------------|-------|
| uranium oxide | 6.03% |
| barium oxide | 2.55% |
| platinum | 1.07% |

EXAMPLE 5: PREPARATION OF A CATALYST (E) ACCORDING TO THE INVENTION 30 g of pure nitric acid is diluted in 3 l of softened water. A quantity of uranyl nitrate and barium acetate equivalent to 79 g of uranium oxide and 33 g of barium oxide is added to the solution. EXP 531 and Disperal aluminas are also added as in Example 1.

When a 0.904 l ceramic block is coated by the method of Example 1 it gains 96 g in weight after activation.

The carrier is then impregnated with 1.064 g of platinum and 0.231 g of rhodium by the method described in Example 1.

The composition of the porous layer of catalyst (E) thus prepared is:

|            |       |
|------------|-------|
| alumina | 90.27% |
| uranium oxide | 5.94% |
| barium oxide | 2.48% |
| platinum | 1.09% |
| rhodium | 0.22% |

EXAMPLE 6: PREPARATION OF A CATALYST (F) ACCORDING TO THE INVENTION 0.5 l of 5N ammonia is added to 150 g of a solution of uranyl nitrate in 0.5 l of water with vigorous agitation. The precipitate obtained is filtered and dried, and calcined for 3 hours at 500° C. It weighs 83 g.

79 g of uranium oxide and a quantity of barium acetate corresponding to 33 g oxide are added to an acid suspension of EXP 531 and Disperal aluminas prepared as in Example 1.

The suspension is used to coat a 0.904 l ceramic block by the method of Example 1.

The gain in the weight of the block after activation is 97 g.

The carrier is then impregnated with 1.064 g of platinum and 0.213 of rhodium by the method described in Example 1.

The composition of the porous layer of catalyst (F) thus prepared is:

|            |       |
|------------|-------|
| alumina | 90.37% |
| uranium oxide | 5.88% |
| barium oxide | 2.45% |
| platinum | 1.08% |
| rhodium | 0.22% |

EXAMPLE 7: PREPARATION OF A CATALYST (G) ACCORDING TO THE INVENTION

A 0.904 l ceramic block is coated with 90 g of alumina following the method of Example 1.

The block is impregnated with 150 ml of an aqueous solution of uranyl nitrate and barium acetate corresponding to 6 g of uranium oxide and 2.5 g of barium oxide. It is activated by calcination at 500° C. for 3 hours.

The carrier is then impregnated with 1.064 g of platinum and 0.213 g of rhodium by the method described in Example 1.

The composition of the porous layer of catalyst (G) thus prepared is:

|            |       |
|------------|-------|
| alumina | 90.20% |
| uranium oxide | 6.01% |
| barium oxide | 2.51% |
| platinum | 1.07% |
| rhodium | 0.21% |

EXAMPLE 8: PREPARATION OF A COMPARATIVE CATALYST (H)

A 0.904 l ceramic block is coated with 90 g of alumina by the method described in Example 1.

The carrier is impregnated with 150 ml of an aqueous solution of lanthanum nitrate corresponding to 2.5 g of lanthanum oxide. It is then actived by calcination at 500° C. for 3 hours.

The carrier is impregnated with 1.064 g of platinum and 0.213 g of rhodium by the method described in Example 1.

The composition of the porous layer of catalyst (H) thus prepared is:

|            |       |
|------------|-------|
| alumina | 95.97% |
| lanthanum oxide | 2.67% |
| platinum | 1.13% |
| rhodium | 0.23% |

EXAMPLE 9: PREPARATION OF A CATALYST (I) ACCORDING TO THE INVENTION

A catalyst is prepared by the same procedure as in Example 8, but the solution for impregnation of the coated block contains a quantity of uranyl nitrate corresponding to 6 g of uranium oxide in addition to the lanthanum nitrate.

The carrier is impregnated with 1.064 g of platinum and 0.213 g of rhodium by the method described in Example 1.

The composition of the porous layer of catalyst (I) thus prepared is:

|            |       |
|------------|-------|
| alumina | 90.20% |
| uranium oxide | 6.01% |
| lanthanum oxide | 2.51% |
| platinum | 1.07% |
| rhodium | 0.21% |

EXAMPLE 10: PREPARATION OF A COMPARATIVE CATALYST (J)

A catalyst is prepared by the procedure described in Example 7, but the lanthanum nitrate is replaced by a quantity of potassium nitrate equivalent to 2.5 g of potassium oxide.

The carrier is impregnated with 1.064 g of platinum and 0.213 g of rhodium by the method described in Example 1.

The composition of the porous layer of catalyst (J) thus prepared is:

|            |       |
|------------|-------|
| alumina | 95.97% |

-continued

| | |
|---|---|
| potassium oxide | 2.67% |
| platinum | 1.13% |
| rhodium | 0.23% |

EXAMPLE 11: PREPARATION OF A CATALYST (K) ACCORDING TO THE INVENTION

A catalyst carrier formed by a 0.904 l ceramic block coated with 90 g of alumina is prepared as in Example 7.

The carrier is impregnated with 150 ml of a solution of uranyl nitrate and potassium nitrate corresponding to 6 g of uranium oxide and 2.5 g of potassium oxide.

The carrier is then impregnated with 1.064 g of platinum and 0.213 g of rhodium by the method described in Example 1.

The composition of the porous layer of catalyst (K) thus prepared is:

| | |
|---|---|
| alumina | 90.20% |
| uranium oxide | 6.01% |
| potassium oxide | 2.51% |
| platinum | 1.07% |
| rhodium | 0.21% |

EXAMPLE 12: PREPARATION OF A CATALYST (L) ACCORDING TO THE INVENTION

A carrier is prepared by the procedure described in Example 4.

The coated block is then steeped in 150 ml of a solution of hexachloroplatinic acid and palladium nitrate containing 0.426 g of platinum and 0.851 g of palladium. After one hour of contact the block is dried at 150° C. for one hour then calcined at 600° C. for 3 hours.

The composition of the porous layer of catalyst (M) thus prepared is:

| | |
|---|---|
| alumina | 90.14% |
| uranium oxide | 6.03% |
| barium oxide | 2.55% |
| platinum | 0.85% |
| rhodium | 0.43% |

EXAMPLE 13: PREPARATION OF A COMPARATIVE CATALYST (M)

A catalyst carrier is prepared by the procedure described in Example 2.

The carrier is impregnated with 150 ml of hexachloroplatinic acid solution containing 1.277 g of platinum. After one hour of contact the block is dried at 150° C. for one hour, then calcined at 500° C. for 3 hours.

The composition of the porous layer of catalyst (M) thus prepared is:

| | |
|---|---|
| alumina | 89.93% |
| uranium oxide | 8.79% |
| platinum | 1.28% |

EXAMPLE 14: PREPARATION OF A CATALYST (O) ACCORDING TO THE INVENTION

A catalyst carrier containing alumina and barium and uranium oxides is prepared by the procedure described in Example 7.

The carrier is impregnated with 150 ml of a hexachloroplatinic acid solution containing 1.277 g of platinum. After one hour of contact the block is dried at 150° C. for one hour, then calcined at 500° C. for 3 hours.

The composition of the porous layer of catalyst (N) thus prepared is:

| | |
|---|---|
| alumina | 90.20% |
| uranium oxide | 6.01% |
| barium oxide | 2.51% |
| platinum | 1.28% |

EXAMPLE 15: PREPARATION OF A CATALYST (O) ACCORDING TO THE INVENTION

The catalyst carrier comprising alumina and barium and uranium oxides is prepared by the procedure described in Example 7.

The carrier is impregnated with 150 ml of a solution of hexachloroplatinic acid and palladium nitrate containing 0.851 g of platinum and 0.426 g of palladium. After one hour of contact the block is dried at 150° C. for one hour, then calcined at 500° C. for 3 hours.

The composition of the porous layer of catalyst (N) thus prepared is:

| | |
|---|---|
| alumina | 90.20% |
| uranium oxide | 6.01% |
| barium oxide | 2.51% |
| platinum | 0.85% |
| palladium | 0.43% |

EXAMPLE 16: PREPARATION OF A CATALYST (P) ACCORDING TO THE INVENTION

A 0.94 liter metal carrier with 62 channels per $cm^2$, produced by Behr under the tradename Metalit, is oxidised in a slightly oxidising atmosphere at 950° C. It is then coated with a porous layer containing alumina and barium and uranium oxides by the procedure described in Example 4, except that the 30 g of nitric acid is replaced by 28 g of acetic acid.

The porous layer weighs 93 g.

The carrier is impregnated with 150 ml of a solution of dinitrodiammino platinum and ammonium hexachlororhodate, containing 1.106 g of platinum and 0.221 g of rhodium. After 5 minutes of contact the block is dried at 150° C. for one hour, and calcined at 500° C. for 3 hours.

The composition of the porous layer of catalyst (P) thus prepared is:

| | |
|---|---|
| alumina | 89.77% |
| uranium oxide | 6.21% |
| barium oxide | 2.62% |
| platinum | 1.17% |
| rhodium | 0.23% |

EXAMPLE 17: PREPARATION OF A CATALYST (Q) ACCORDING TO THE INVENTION

A solution of uranyl nitrate and barium nitrate, containing the equivalent of 200 g of uranium oxide and 120 g of barium oxide, is impregnated onto 680 g of EXP 531 alumina. After calcination and grinding, the powder is used as in Example 4, to coat a 0.904 l ceramic block.

The carrier is then impregnated with 1.064 g of platinum and 0.213 g of rhodium by the procedure described in Example 1.

The composition of the porous layer of catalyst (Q) thus prepared is:

| alumina | 72.30% |
|---|---|
| uranium oxide | 16.45% |
| barium oxide | 9.97% |
| platinum | 1.07% |
| rhodium | 0.21% |

EXAMPLE 18: POST COMBUSTION ACTIVITY OF THE VARIOUS CATALYSTS

The catalysts are aged and tested on an engine test bench with a 1900 cc engine. The engine has an injection feed controlling the richness of the air/fuel mix from the reading on an oxygen probe located on the exhaust pipe; it operates with a premium grade petrol complying with Eurosuper specifications.

The catalysts are placed in a metal case, except the one in Example 16, which already has a case. They are installed on the exhaust line about 1 m away from the engine. A system to regulate the temperature of the exhaust fumes between 150° and 600° C. is installed between the engine and the catalyst.

The so-called new catalysts are in fact preconditioned for 2 hours in exhaust gas at richness 1 at a temperature of 500° C.

In the phase when the catalysts are aged the engine test bench operates at a mean richness of 0.95, and with an action equivalent to that of a vehicle travelling at 150 km/h: the exhaust gases are oxidising and their mean temperature is about 800° to 900° C. Under such conditions an ageing time of 200 hours simulates ageing under real life conditions on a vehicle travelling at 80,000 km.

The catalytic test is carried out on the engine test bench operating at the mean richness of 1 in pulsating mode, that is to say, with periodic variation of richness. In these tests the pulsating frequency is 1 Hz and the pulsating amplitude 0.05.

The concentration of carbon monoxide before and after it passes over the catalyst is determined by an infra red analyzer.

The concentration of hydrocarbons is determined with a flame ionisation detector.

The concentration of nitrogen oxides is determined with an analyzer working by chemiluminescence.

The integral conversion of a pollutant is the ratio of the integral of the curve representing the conversion of that pollutant as a function of temperature from 250° to 550° C., to the integral which would result from total conversion throughout the temperature range considered. It is expressed as a percentage.

Table 1 below sets out the results obtained in eliminating carbon monoxide (CO), hydrocarbons (HC) and nitrogen oxides (NOx) with the various catalysts (A), (B), (C), (D), (E), (F), (G), (H), (I), (J), (K), (L), (M), (N), (O), (P) and (Q) in examples 1 to 17.

TABLE 1

| Example No. | Reference of Catalyst | Integral Conversion of CO Catalyst | | Integral Conversion of HC Catalyst | | Integral Conversion of NOx Catalyst | |
|---|---|---|---|---|---|---|---|
| | | new | aged | new | aged | new | aged |
| 1 | A | 74% | 62% | 72% | 62% | 67% | 53% |
| 2 | B | 72% | 60% | 71% | 59% | 64% | 53% |
| 3 | C | 58% | 37% | 55% | 32% | 55% | 29% |
| 4 | D | 84% | 77% | 74% | 71% | 73% | 65% |
| 5 | E | 77% | 67% | 75% | 65% | 68% | 57% |
| 6 | F | 82% | 76% | 74% | 70% | 76% | 65% |
| 7 | G | 82% | 75% | 74% | 69% | 75% | 65% |
| 8 | H | 60% | 33% | 55% | 30% | 58% | 28% |
| 9 | I | 80% | 71% | 72% | 66% | 70% | 62% |
| 10 | J | 56% | 33% | 54% | 32% | 54% | 31% |
| 11 | K | 82% | 71% | 73% | 65% | 73% | 64% |
| 12 | L | 76% | 68% | 72% | 65% | 68% | 57% |
| 13 | M | 68% | 32% | 70% | 35% | 48% | 25% |
| 14 | N | 76% | 63% | 73% | 59% | 54% | 35% |
| 15 | O | 78% | 68% | 74% | 64% | 67% | 58% |
| 16 | P | 85% | 77% | 76% | 70% | 75% | 65% |
| 17 | Q | 81% | 75% | 71% | 69% | 70% | 62% |

It will be seen that catalysts prepared according to the invention are improved relative to the prior art catalysts or comparative catalysts, both as regards initial activity and as regards activity after ageing on an engine test bench at high temperatures and under oxidising conditions.

EXAMPLE 18: CLEANING OF POLLUTANTS FROM EXHAUST GAS FROM A DIESEL ENGINE

The catalyst (N) containing platinum and uranium, barium and aluminium oxides on a cordierite carrier is compared with the catalyst (M) not containing any barium, in the depollution of exhaust gas from a diesel engine.

Each catalyst is mounted in a removable container, then subjected to the action of exhaust gas from a Peugeot 505 vehicle with a diesel engine for 30 minutes, so that soot is deposited on it.

The container is removed and the catalyst installed in a laboratory apparatus for continuously measuring the concentration of CO, HC and NOx at the inlet and outlet of the catalyst.

An aliquot part of 70 cm$^3$ of each catalyst is then subjected to a continuous rise in temperature from 150° to 550° C., while 900 l per hour of a gaseous mixture passes through it, the mixture containing 1000 ppm of $C_3H_8$, 1000 ppm of CO, 600 ppm of NO, 5% of $O_2$, 8% of $H_2O$ and the balance to 100% of $N_2$.

The concentration of $CO_2$ at the outlet from each catalyst equals the sum of the concentrations of $CO_2$ emanating from oxidation of soot, oxidation of CO and oxidation of HC. If the concentrations of CO and HC at the inlet and outlet of the catalysts are measured, the concentration of $CO_2$ resulting from these oxidation processes can be obtained. The concentration of $CO_2$ resulting from soot combustion can be obtained from the difference between the concentration thus calculated and the total concentration of $CO_2$ at the outlet from the catalyst.

The concentration of $CO_2$ resulting from oxidation of soot reaches a value of 200 ppm from 300° C. in the case of catalyst (N), whereas with catalyst containing only platinum and alumina a temperature of at least 340° C. is required to obtain such a concentration of $CO_2$ from oxidation of soot.

This shows that catalysts containing uranium and a metal P initiate combustion of soot from a diesel engine, and thus of the polyaromatic compounds contained therein, at a temperature lower than that required by catalysts which contain uranium but no metal P.

We claim:

1. A multifunctional catalyst for converting carbon dioxide, hydrocarbons and nitrogen oxides contained in exhaust fumes from internal combustion engines comprising a carrier containing a porous layer which contains a catalytically active phase comprising at least one metal A selected from the group consisting of platinum, rhodium, palladium, ruthenium, iridium and mixtures thereof, characterised in that the porous layer comprises, as a dry weight percentage:
   about 50 to about 99.7% of at least one refractory inorganic oxide,
   about 0.1 to about 25% of at least one uranium oxide,
   about 0.1 to about 35% of at least one oxide of at least one metal P selected from the group consisting of lithium, sodium, potassium, rubidium, cesium, beryllium, magnesium, calcium, strontium, barium, lanthanum, praseodymium, neodymium, gadolinium, and yttrium, and
   about 0.1 to about 20% of said at least one metal A.

2. The catalyst of claim 1, wherein the porous layer is made up of spheres or extrusions.

3. The catalyst of claim 1, wherein the carrier comprises a substrate made of metal or ceramic material.

4. The catalyst of claim 3, wherein the substrate is a material of monolithic form with a cellular structure.

5. The catalyst of claim 1, wherein the porous layer comprises, as a dry weight percentage:
   about 82 to about 96.6% of at least one refractory inorganic oxide,
   about 2 to about 12% of at least one uranium oxide,
   about 1 to about 15% of at least one oxide of said metal P, and
   about 0.4 to about 8% of at least one metal A.

6. The catalyst of claim 1, wherein the sum of the concentrations by weight of uranium and at least one metal P, expressed in elemental form, is at least one-third of the concentration of the at least one metal A.

7. The catalyst of claim 1, wherein the refractory inorganic oxide is selected from the group consisting of alpha alumina, gamma alumina, delta alumina, kappa alumina, eta alumina, theta alumina, rho alumina, chi alumina, silica, alumina-silica, zeolites and mixtures thereof.

8. The catalyst of claim 3, wherein the porous layer represents a quantity of from 20 to 200 g/l of substrate.

9. A method of preparing a multifunctional catalyst for converting carbon dioxide, hydrocarbons and nitrogen oxides contained in exhaust fumes from internal combustion engines, comprising a carrier containing a porous layer which contains a catalytically active phase comprising at least metal A selected from the group consisting of platinum, rhodium, palladium, ruthenium, iridium and mixtures thereof, characterised in that the porous layer comprises, as a dry weight percentage:
   about 50 to about 99.7% of at least one refractory inorganic oxide,
   about 0.1 to about 25% of at least one uranium oxide,
   about 0.1 to about 35% of at least one oxide of at least one metal P selected from the group consisting of lithium, sodium, potassium, rubidium, cesium, beryllium, magnesium, calcium, strontium, barium, lanthanum, praseodymium, neodymium, gadolinium, yttrium and zirconium, and
   about 0.1 to about 20% of said at least one metal A,
   said method being characterised by the following successive stages:
   a) preparing an aqueous suspension of at least one refractory inorganic acid, at least one uranium salt or oxide and at least one salt or oxide of metal P, or at least one composite oxide of uranium and metal P,
   b) coating a substrate with the suspension so as to obtain the porous layer containing said inorganic oxide, said uranium salt or oxide and said salt or oxide of metal P, or said composite oxide of uranium and metal P,
   c) drying and carrying our heat treatment at a temperature below 1000° C.,
   d) impregnating the porous layer resulting from stage c) with a solution of at least one precursor of at least one metal A, and
   e) drying and carrying out heat treatment below a temperature of 1000° C.

10. A method of preparing a multifunctional catalyst for converting carbon dioxide, hydrocarbons and nitrogen oxides contained in exhaust fumes from internal combustion engines, comprising a carrier containing a porous layer which contains a catalytically active phase comprising at least metal A selected from the group consisting of platinum, rhodium, palladium, ruthenium, iridium and mixtures thereof, characterised in that the porous layer comprises, as a dry weight percentage:
   about 50 to about 99.7% of at least one refractory inorganic oxide,
   about 0.1 to about 25% of at least one uranium oxide,
   about 0.1 to about 35% of at least one oxide of at least one metal P, selected from the group consisting of lithium, sodium, potassium, rubidium, cesium, beryllium, magnesium, calcium, strontium, barium, lanthanum, praseodymium, neodymium, gadolinium, yttrium and zirconium, and
   about 0.1 to about 20% of said at least one metal A,
   said method being characterised by the following successive stages:
   a) preparing an aqueous suspension of at least one refractory inorganic oxide,
   b) coating a substrate with the suspension so as to obtain the porous layer containing the refractory inorganic oxide,
   c) drying the substrate and carrying out heat treatment at a temperature below 1000° C.
   d) impregnating the porous layer resulting from stage c)
   either with a solution of at least one uranium salt and at least one salt of metal P,
   or with a solution of at least one uranium salt, at least one salt of metal P and at least part of at least one precursor of at least one metal A,
   e) drying the impregnated porous layer and carrying out heat treatment at a temperature below 1000° C.,
   f) impregnating the porous layer resulting from stage e) either with all of at least one precursor of at least one metal A, or with the remainder of at least one precursor of at least one metal A, and
   g) drying the impregnated porous layer and carrying out heat treatment at a temperature below 1000° C.

11. A method of preparing a multifunctional catalyst for converting carbon dioxide, hydrocarbons and nitrogen oxides contained in exhaust fumes from internal combustion engines, comprising a carrier containing a porous layer which contains a catalytically active phase comprising at least metal A selected from the group consisting of platinum, rhodium, palladium, ruthenium, iridium and mixtures thereof, characterised in that the porous layer comprises, as a dry weight percentage:

about 50 to about 99.7% of at least one refractory inorganic oxide, about 0.1 to about 25% of at least one uranium oxide, about 0.1 to about 35% of at least one oxide of at least one metal P selected from the group consisting of lithium, sodium, potassium, rubidium, cesium, beryllium, magnesium, calcium, strontium, barium, lanthanum, praseodymium, neodymium, gadolinium, yttrium and zirconium, and about 0.1 to about 20% of said at least one metal A, the porous layer being made up of spheres or extrusions, said method being characterised by the following successive stages:

a) impregnating spheres or extrusions of at least one refractory inorganic oxide with a solution of at least one uranium salt and at least one salt of metal P, b) drying the spheres or extrusions and carrying out heat treatment at a temperature below 1000° C., c) impregnating the spheres or extrusions resulting from stage b) with a solution of at least one precursor of at least one metal A and d) drying the spheres or extrusions impregnated in stage c) and carrying out heat treatment at a temperature below 1000° C.

12. A preparation method of claim 11, wherein stage b) of claim 11 is followed by the steps of:

c) grinding the spheres or extrusions to obtain a powder, d) preparing an aqueous suspension containing said powder and possibly adding at least one refractory inorganic oxide, e) coating the substrate with the suspension, so as to obtain the porous layer containing the refractory oxide or oxides and said oxides of uranium and of at least one metal P, f) impregnating the porous layer resulting from stage e) with a solution of at least one precursor of at least one metal A, g) drying the porous layer and carrying out heat treatment at a temperature below 1000° C.

13. A preparation method of claim 9 or claim 10, wherein the substrate comprises metal sheets, and wherein either said sheets are coated and impregnated, subjected to heat treatment and shaped as blocks, or said sheets are coated, subjected to heat treatment and shaped as blocks, after which the porous layer resulting from the heat treatment is impregnated with a solution of at least precursor of at least one metal A, and heat treatment is carried out at a temperature below 1000° C.

14. The catalyst of claim 1, wherein the sum of the concentrations by weight of uranium and at least one metal P, expressed in elemental form, is at least half the concentration of the at least one metal A.

15. The catalyst of claim 1, wherein the refractory inorganic oxide is selected from the group consisting of alpha alumina, gamma alumina, delta alumina, kappa alumina, eta alumina, theta alumina, rho alumina and chi alumina.

16. The catalyst of claim 3, wherein the porous layer represents a quantity of from 50 to 150 g/l of substrate.

* * * * *